(12) United States Patent
Houde-Walter et al.

(10) Patent No.: US 9,715,000 B2
(45) Date of Patent: Jul. 25, 2017

(54) SYSTEM AND METHOD FOR FRIEND OR FOE IDENTIFICATION

(75) Inventors: Susan Houde-Walter, Rush, NY (US); Christopher A. Gagliano, Rochester, NY (US); Daniel Balonek, Bergen, NY (US)

(73) Assignee: LaserMax, Inc., Rochester, NY (US)

( * ) Notice: Subject to any disclaimer, the term of this patent is extended or adjusted under 35 U.S.C. 154(b) by 905 days.

(21) Appl. No.: 13/053,993

(22) Filed: Mar. 22, 2011

(65) Prior Publication Data

US 2011/0231035 A1    Sep. 22, 2011

Related U.S. Application Data

(60) Provisional application No. 61/316,144, filed on Mar. 22, 2010.

(51) Int. Cl.
*B64C 39/02* (2006.01)
*G01S 1/70* (2006.01)
*B64D 33/00* (2006.01)

(52) U.S. Cl.
CPC ............... *G01S 1/70* (2013.01); *B64C 39/024* (2013.01)

(58) Field of Classification Search
CPC ......... G01S 1/70; B64C 39/024; B64D 33/08; B64D 2033/024
See application file for complete search history.

(56) References Cited

U.S. PATENT DOCUMENTS

| | | | | |
|---|---|---|---|---|
| 2,956,585 A | * | 10/1960 | Alsworth | B64D 13/08 137/552 |
| 5,434,668 A | * | 7/1995 | Wootton | G01H 9/00 356/450 |
| 5,481,433 A | * | 1/1996 | Carter | B60L 3/00 165/185 |
| 5,583,507 A | * | 12/1996 | D'Isepo | G01S 13/756 342/45 |
| 5,671,802 A | * | 9/1997 | Rogers | B60R 16/0239 123/198 E |
| 5,966,227 A | * | 10/1999 | Dubois | G01S 17/74 342/45 |
| 6,493,123 B1 | * | 12/2002 | Mansell | H04B 10/2587 342/45 |
| 6,575,402 B1 | * | 6/2003 | Scott | B64C 27/20 244/12.2 |
| 2008/0304524 A1 | * | 12/2008 | Marsland, Jr. | B82Y 20/00 372/29.011 |
| 2011/0036983 A1 | * | 2/2011 | Ford | G01J 1/04 250/338.1 |

* cited by examiner

*Primary Examiner* — Stephen Holwerda
(74) *Attorney, Agent, or Firm* — Ronald R. Schindler, II; Dominic Ciminello; Lee & Hayes, PLLC (57) ABSTRACT

A system for use in identifying one of an unmanned ground vehicle and an unmanned aerial vehicle includes a signal emitter associated with the unmanned vehicle. The signal emitter includes at least one quantum cascade laser. The signal emitter emits a signal having a wavelength between approximately 2 μm and approximately 30 μm, and the signal is detectable to identify the unmanned vehicle as friendly at a distance from the signal emitter greater than approximately 1 meter.

21 Claims, 6 Drawing Sheets

SYSTEM AND METHOD FOR FRIEND OR FOE IDENTIFICATION

CROSS-REFERENCE TO RELATED APPLICATIONS

This non-provisional application claims the benefit of U.S. Provisional Application No. 61/316,144, filed Mar. 22, 2010, the entire disclosure of which is incorporated herein by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

Field of the Invention

The present disclosure relates to signal emitting devices and, in particular, devices useful in friend or foe identification.

Description of Related Art

Unmanned vehicles are heavily used in various environments for reconnaissance, aerial photography, combat activities, rescue efforts, and other purposes. For example, an unmanned vehicle ("UV") may be a reconnaissance aircraft, drone, unmanned aerial vehicle, or other like device that can be controlled remotely to fly over and/or otherwise in the vicinity of unfriendly forces, contaminated terrain, or other potentially dangerous areas. As another example, a UV may be a ground vehicle, robot, or other like device that can be controlled remotely to travel and maneuver, via land and/or sea, proximate such potentially dangerous areas. Such exemplary devices include, for example, the BigDog and other rough-terrain robots manufactured by Boston Dynamics of Waltham, Mass., the PackBot manufactured by iRobot of Bedford, Mass., and other similar devices.

Until recently, friendly reconnaissance groups, rescue groups, law enforcement groups, combat personnel or other friendly forces were the only users of UVs. However, UVs are now becoming more widely used by unfriendly or foe opposition groups. Such groups are finding it increasingly easy to equip these UVs with harmful equipment or devices, thereby putting friendly forces at risk. In some environments it can be difficult for friendly forces to distinguish between friendly UVs and foe UVs, and this difficulty can be heightened under the stress of combat situations.

It is understood that known markers, locating lasers, beacons, or other like signal emitters can be connected to and/or otherwise associated with such UVs to assist in locating and/or identifying UVs at moderate distances. However, these known signal emitters are plagued by a host of debilitating drawbacks that make them inefficient or potentially dangerous for use in combat arenas. For instance, while many signal emitters are clearly visible by conventional night vision goggles or other like viewing devices, such viewing devices are widely available and used by both friendly forces and unfriendly groups. Thus, friendly UVs equipped with known signal emitters can be detected by the unfriendly groups, making stealth operation of such UVs difficult, if not impossible.

In addition, most known signal emitters are not easily programmable or modifiable in the field, and are not configured to emit a diverse range of, for example, pulse signatures, beams, or signals. As a result, it is relatively easy for unfriendly groups to "disguise" their UVs by programming the signal emitters associated with such UVs to emit substantially the same signature or signal as that emitted by, for example, a friendly signal emitter. Such ease of deception can be very dangerous in certain environments.

Moreover, some known signal emitters, such as thermal markers or other devices emitting radiation, pulse signatures, or other signals in the thermal band, may have a limited detection range. For example, while friendly forces and UVs may be equipped with known thermal markers for friend or foe identification, the signals emitted by these devices may not be easily detected beyond a range of several hundred meters. This range may be relevant in a tightly confined arena of engagement, but such a limited range can put friendly forces at risk when UVs are used. For example, UVs such as the BigDog or unmanned aerial vehicles discussed above can move at high rates of speed and may approach or operate (in the case of unmanned aerial vehicles) at distances greater than 1 km from the combat arena. Not being able to detect a UV, or determine whether or not the detected UV is friendly, unless and until the UV is within several hundred meters of, for example, an engagement arena or other area occupied by friendly forces, can put these forces at serious risk.

Moreover, devices used in military, law enforcement, surveillance, and other industries may also employ signal emitters in various environments to mark an object or location, and/or to otherwise convey information about the object or location. Such devices may include, for example, unattended ground sensors/devices, self-righting camera balls such as the Eye Ball R1 Surveillance Ball manufactured by Remington Arms Company, Inc. of Madison, N.C., and other like devices. Moreover, such information may include, for example, whether or not to engage the object, or the location of a target, hidden resources, friendly forces, or checkpoints along a path. However, known signal emitters may not be suitable for use with such devices due to the deficiencies discussed above. For example, signals emitted by thermal markers may not be easily seen from great distances, thus making locating such devices difficult.

The various embodiments set forth in the present disclosure are directed toward overcoming the problems discussed above.

BRIEF SUMMARY OF THE INVENTION

In an exemplary embodiment of the present disclosure, a system for use in identifying one of an unmanned ground vehicle and an unmanned aerial vehicle includes a signal emitter associated with the unmanned vehicle. The signal emitter includes at least one quantum cascade laser. The signal emitter emits a signal having a wavelength between approximately 2 µm and approximately 30 µm, and the signal is detectable to identify the unmanned vehicle as friendly at a distance from the signal emitter greater than approximately 1 meter.

In a further exemplary embodiment of the present disclosure, a method of identifying one of an unmanned ground vehicle, an unmanned aerial vehicle, and an unmanned aqueous vehicle includes detecting a signal emitted by a signal emitter associated with the unmanned vehicle from a distance greater than approximately 1 meter. The signal emitter includes a quantum cascade laser, and the signal has a wavelength between approximately 2 µm and approximately 30 µm. The method also includes identifying the unmanned vehicle as friendly based on one or more observable characteristics of the detected signal. Such a method also includes modulating the signal to indicate the unmanned vehicle as being one of a plurality of friendly vehicles. Additionally, in such a method the observable characteristic of the signal is encrypted by temporally modulating the signal.

In another exemplary embodiment of the present disclosure, a system for use in identifying a location of interest and emitting a signal containing information regarding the location includes a handheld signal emitter including a quantum cascade laser. The signal emitter is configured to emit the signal in response to a command. The signal has a wavelength between approximately 2 µm and approximately 30 µm, and is detectable to convey the information at a distance from the signal emitter greater than approximately 1 meter.

In another exemplary embodiment of the present disclosure, a system for use in identifying a location of interest and emitting a signal containing information regarding the location includes a signal emitter associated with one of a portable self-righting device and a portable unattended ground device, the device configured to be transported to and desirably positioned at the location, the signal emitter including a quantum cascade laser. The signal emitter is configured to emit the signal in response to a command. The signal has a wavelength between approximately 2 µm and approximately 30 µm, and is detectable to convey the information at a distance from the signal emitter greater than approximately 1 meter.

DETAILED DESCRIPTION OF THE INVENTION

Figure 1:
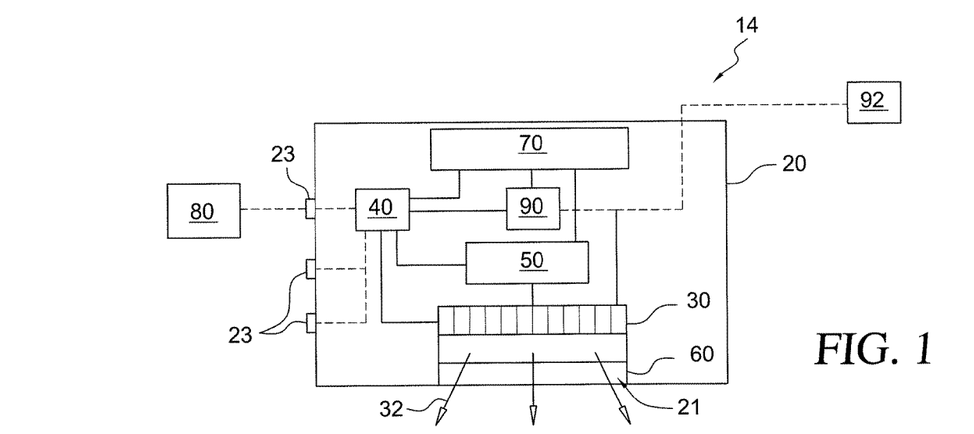
FIG. 1 is a schematic view of a signal emitter according to an exemplary embodiment of the present disclosure.

FIG. 1 illustrates a signal emitter 14 according to an exemplary embodiment of the present disclosure. The signal emitter 14 may emit a signal in the optical portion of spectrum or in the thermal band. In addition, the beam can be a continuous wave, a temporally modulated beam, or a temporally encoded signal, wherein the temporally encoded signal can be encrypted or unencrypted. Thus the signal emitter 14 may be, for example, any type of signal emitter capable of emitting a signal in the form of one or more thermal or optical beams, pulses, or other identifiable signal types. Such an optical beam may have a wavelength between approximately 0.3 µm and approximately 2 µm, and such a thermal beam may have a wavelength between approximately 2 µm and approximately 30 µm.

In an exemplary embodiment, the signal emitter 14 may emit a signal between approximately 2 µm and approximately 30 µm, and the signal may be detected within a range of approximately 4 km or greater. In additional exemplary embodiments, the signal may be detected within a range of approximately 1 meter or greater. As shown in FIG. 1, such an exemplary signal emitter 14 may comprise a quantum cascade laser ("QCL") 30 or other signal source known in the art. The signal emitter 14 may also include a housing 20, a driver 40, a cooler 50, a lens 60, and a power supply 70.

The housing 20 can be configured for handheld use, firearm mounting, or mounting to any of the unmanned devices 12 discussed herein. The housing 20 is selected to encompass at least one of the QCL 30, the driver 40, the cooler 50, the lens 60, and the power supply 70. In one configuration, the housing 20 encompasses (retains) all the components required for operation of the QCL 30. That is, the housing 20 provides the signal emitter 14 as a self-contained, handheld, and/or otherwise portable device.

The housing 20 can include an aperture 21 for emission of a beam or other signal from the QCL 30. In addition, the housing 20 can include one or more apertures, switches, connectors, or ports 23 for controlling, activating, deactivating, and/or powering the signal emitter 14. The ports 23 may comprise, for example, an on/off switch, switches or controls for operating mode selections, and/or power connectors configured to assist in connecting the signal emitter 14 to a power supply 80 of the unmanned device 10 to which the signal emitter 14 is connected. Each of the ports 23 may be connected to the driver 40 through any known electrical connection such that power, control commands, or other signals may be communicated from the ports 23 to the driver 40. Such ports 23 may facilitate remote activation and/or deactivation of the signal emitter 14. As will be described in greater detail below, the signal emitter 14 may further include any combination of transponders, antennas, power circuits, receivers, and/or other known components to facilitate such remote control and/or operation. Such components may also assist in, for example, conserving stored energy of the power supply 70. For example, the signal emitter 14 may be configured to operate in a relatively low current mode of operation until receiving an activation signal. Upon receipt of such a signal, the signal emitter 14 may, for example, change modes and begin emitting a desired signal.

The housing 20 can be formed of any of a variety of rigid material such as composites, laminates, plastics or metals. In one configuration, the housing 20 may be formed of an extruded aluminum, thereby providing sufficient strength without requiring significant weight. However, it is understood the housing 20 can be machined such as by EDM (electrical discharge machining) or molding if composites, laminates, plastics or even metals are employed for the housing 20. The housing 20 may be substantially watertight so as to protect the components disposed therein from water or other harmful contaminants found in rugged environments such as combat arenas.

In one configuration of the signal emitter 14, the housing 20 may be configured to mount to any of a variety of handheld, side, and small firearms. Such firearms include, but are not limited to, pistols, rifles, shotguns, automatic arms, semi-automatic arms, and bows. For example, the housing 20 may be configured to mount to any known sidearm, as well as any known dismounted crew-served weapon, such as machine guns and the like. The housing 20 can interface with any of a variety of clamping or mounting mechanisms such as a Weaver-style Picatinny rail or dove tail engagement for mounting to these firearms.

Alternatively, as discussed above, the housing 20 may be configured to mount to any of a variety of unmanned devices 12 used in surveillance, law enforcement, reconnaissance, target marking, friendly force marking, or combat applications. As illustrated more clearly in FIGS. 3-7, such unmanned devices 12 include, but are not limited to, any of the UVs discussed herein, unattended ground sensors, self-righting camera balls, and other like devices. In additional exemplary embodiments, any and/or all components of the signal emitter 14 may be integrally incorporated into such devices 12. In such embodiments, the housing 20, or portions thereof, may be omitted if desired. For example, in an embodiment in which the signal emitter 14 is formed integrally with a robot, UV, unmanned aerial vehicle, unattended ground sensor, or other like device, the components of the signal emitter 14 may be hermetically sealed within such devices and the housing 20 may be omitted to reduce size, weight, space, power consumption, and/or drag associated with the signal emitter 14. In such embodiments, one or more windows, lenses, domes, or other components may be employed proximate an outer surface of the device 12 to facilitate emission of radiation from the integral signal emitter components.

Such unmanned devices 12 may further include marking devices capable of marking, for example, a trail or path, an intended target, the location of friendly forces, distressed friendly forces in need of assistance, and/or a perimeter, or other relevant areas or items. Such marking devices may include, for example, unmanned robots capable of stealthily approaching unsuspecting targets and marking the location of such targets. Other such marking devices may be relatively small devices easily carried and set on the ground or in other typical locations by soldiers traversing a complicated trail or path.

With continued reference to FIG. 1, the QCL 30 is retained within and/or otherwise connected to or associated with the housing 20. The QCL 30 may be configured, via the lens 60, to produce a beam extending along a beam path. It is understood that any of a variety of lenses, 60, windows, domes, diffraction gratings, filters, prisms, mirrors, and/or other like optical components, or combinations thereof, may be disposed optically downstream of the QCL 30 along the beam path. Due to their position along and/or within the beam path and optically downstream of the QCL 30, radiation emitted by the QCL 30 may pass through, be shaped by, and/or otherwise optically interact with such optical components before exiting the housing 20. In an exemplary embodiment, one or more lenses 60 of the type described herein may be positioned in the beam path and optically upstream of a window, dome, or other like optical component. The beam path may extend from the QCL 30, through a portion of the housing 20, to pass to the exterior of the housing 20.

Figure 2:
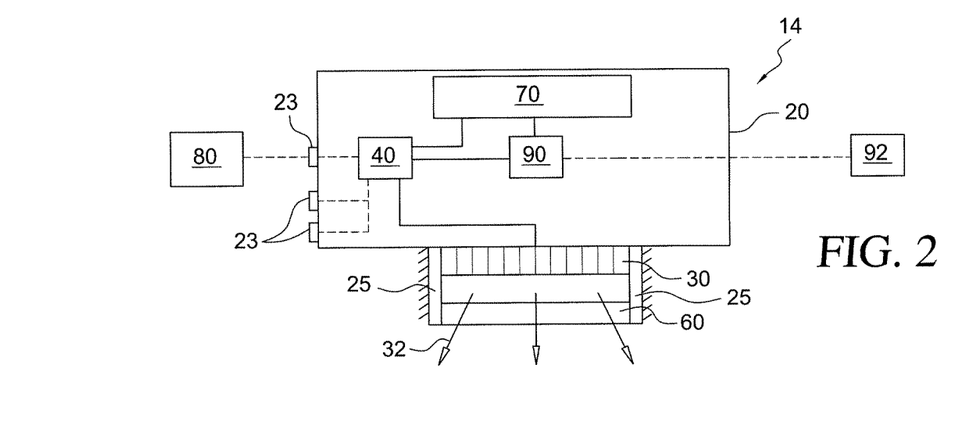
FIG. 2 is a schematic view of a signal emitter according to another exemplary embodiment of the present disclosure.

It is understood that the QCL 30 and/or the lens 60 may be disposed at a portion of the housing 20 configured to assist with cooling the QCL 30 during operation. For example, as shown in FIG. 2, the housing 20 may define one or more extensions 25 or other like structures configured to assist in cooling the QCL 30 through, for example, contact with moving air, and such an embodiment may be useful when connecting the signal emitter 14 to, for example, a relatively fast moving unmanned device 12 such as an unmanned aerial device or an unmanned ground device. Such an extension 25 may be thermally connected to the QCL 30 and may further include, for example, one or more passive cooling devices such as heat sinks, fins, phase change material, or other like devices also thermally connected to the QCL 30. In still another exemplary embodiment, the lens 60 may be omitted, and the radiation or other signal produced by the QCL 30 may be widely divergent based on the nature and configuration of the QCL 30 itself. It is understood that regardless of the housing configuration, and notwithstanding the presence or omission of the lens 60, window, dome, or other like structure, the QCL 30 may be maintained in a hermetically sealed environment during use.

The QCL 30 may be selected to operate in ambient temperature conditions while producing a beam or other such signal having a wavelength between approximately 1 $\mu$m and approximately 30 $\mu$m, with a preferred wavelength of approximately 2 $\mu$m to approximately 5 $\mu$m or approximately 7 $\mu$m to approximately 30 $\mu$m. Although a single QCL 30 is shown in housing 20, it is contemplated that a plurality of QCLs can be disposed within the housing 20, some or all of the QCLs emitting radiation at different respective wavelengths. In additional exemplary embodiments, a single QCL 30 can be employed with an appropriate driver 40 and/or filter to provide a plurality of corresponding wavelengths.

The QCL 30 may exhibit the electrical behavior of a semiconductor material which can be described with the band model. This model states that various energy ranges, or energy bands, are available to the electrons of the semiconductor material, and that the electrons of the semiconductor material can essentially take on any energy value within the energy bands. Various bands can be separated from one another by a band gap, i.e., an energy band with energy values the electrons cannot possess. If an electron changes from a higher energy band to a lower energy band, energy corresponding to the difference of the energy values of the electron before and after the change, which is also called "transition", is released. The energy difference can be released in form of photons. The band with the highest bound-state energy level, which is fully filled with electrons at a temperature of 0° Kelvin, i.e., the so-called valence band, and the conduction band that is energetically above the valence band, which is unfilled at 0° Kelvin, as well as the band gap between them are of special significance for a semiconductor material.

In the cascades of QCLs, the semiconductor materials for the barrier layers and the quantum wells are selected such that the lower conduction band edge of the barrier material lies higher in energy than the lower conduction band edge of the quantum well material. The lower conduction band edge represents the lowest energy value that an electron can assume within the conduction band. The energy difference between the energy of the lower conduction band edge of the barrier material and the lower conduction band edge of the quantum well material is also called the conduction band discontinuity. As a result of this selection, the electrons of the quantum wells cannot readily penetrate the barrier layers and are therefore enclosed in the quantum wells. The electrons can only "tunnel" through a barrier layer into an adjacent quantum well in a quantum-mechanical process, with the probability of the occurrence of a tunneling process depending on the height of the conduction band discontinuity and the thickness of the barrier layer between the two quantum wells.

In the quantum well, the behavior of the electrons enclosed in the well is determined by quantum mechanics effects due to the small thickness of the layer (only a few nanometers). An essential effect is that the electrons in an energy band of the quantum well can no longer assume any energy value within the energy range of the band, but rather are confined to the energy values of specific energy levels, i.e., sub-bands. The energetic differences between the individual sub-bands are particularly high if the quantum well is very thin and the conduction band discontinuity is high. The electron energy does not change continuously, but rather jumps from one sub-band to the next. The electron can change from one energy level to the other energy level only if the energy increase or the energy decrease suffered by an electron corresponds precisely to the difference of the energy values of two sub-bands. Transitions from one energy level to another energy level within one and the same band are called intersubband transitions. In the cascades of the QCL, the emission of laser radiation occurs at these intersubband transitions. For emission of signals having wavelengths between approximately 2.9 µm and 5.3 µm at room temperature, the QCL 30 as set forth in U.S. Publication No. 2005/0213627, published Sep. 29, 2005, assigned U.S. patent application Ser. No. 11/061,727, filed Feb. 22, 2005, is hereby expressly incorporated by reference.

In one configuration, the QCL 30 or other signal sources of the present disclosure may be hermetically sealed within the housing 20, thereby providing a controlled humidity and atmosphere for operation of the QCL 30. Such hermetic sealing can include a subhousing or potting of the QCL 30. The sealing can include a sealing of the housing 20, a sealing of the QCL 30 as the QCL 30 is retained within the housing 20, or both.

In a further exemplary embodiment, the signal or beam source of the signal emitter 14 may comprise an infrared laser (such as at 830 nm) and/or a visible laser (400 nm to 750 nm), such as a model HL6321MG laser manufactured by Hitachi. In such exemplary embodiments, the QCL 30 may be omitted. It is further understood that the QCL 30 may be replaced with one or more carbon dioxide lasers. Such lasers may be useful in any of the applications discussed herein, and may be particularly useful in conjunction with any of the marking devices discussed herein.

In a further configuration, the QCL 30 can be tuned to provide a signal or beam of a specific wavelength, and/or to provide a signal having a pulse or other signature easily recognizable by U.S. or other friendly/allied forces. Tuning of the signal or beam emitted by the QCL 30 can be accomplished by locating a grating in the signal or beam path. The grating can be adjustable to allow selective transmission of a given wavelength, or fixed to transmit only a single wavelength. Although the signature of the signal or beam emitted by the QCL 30 may be preset, the signature, wavelength, frequency, pulse pattern, and/or other identifiable and distinguishable characteristics of the signal or beam may be easily tunable in the field and/or during use. Such ease of tunability may substantially reduce or eliminate, for example, the ability of enemy forces to disguise foe signal emitters as friendly signal emitters 14. In addition to the grating discussed above, it is understood that the driver 40 may be configured to assist in tuning and/or otherwise controlling the output of the QCL 30.

The driver 40 can be constructed to provide either pulsed or continuous wave operation of the QCL 30. The rise/fall time of the pulse, compliance voltage and current for the QCL are selected to minimize power consumption and heat generation. These parameters may also be selected to produce a desirable beam or signal signature for friend or foe identification. The driver 40 may be located within the housing 20, and may be operably connected to the QCL 30, the cooler 50, and/or the power supply 70. Alternatively, the power supply 70 may be omitted and the driver 40 may be operably connected to a power supply 80 of the device 12 to which the signal emitter 14 is connected. The driver 40 may include a pulse generator, an amplifier, a pulse switcher, and/or other known driver components.

The driver 40 may enable operation of the QCL 30 as a pulsed laser, such as by passive, active, or controlled switching. Although specific values depend upon the particular QCL 30 and intended operating parameters, it is contemplated the peak power draw of the driver 40 may be between approximately 1 amp and approximately 10 amps, with an average current draw between approximately 0.01 amps and approximately 0.1 amps. As the required voltage may be between approximately 9 volts and approximately 12 volts, approximately 9 W and approximately 120 W may be consumed. This may represent a substantial power consumption as well as heat generation. Accordingly, in an exemplary embodiment it may be desirable to omit the power supply 70 of the signal emitter 14, and instead, utilize the power supply 80 of the unmanned device 12.

In an exemplary embodiment, the driver 40 may assist in controlling and/or modifying the power level of the QCL 30 to aid in penetrating components or conditions of the atmosphere in which the signal emitter 14 is used. Such components or conditions may include, for example, snow, rain, fog, smoke, mist, clouds, wind, dust, gas, sand, and/or other known atmospheric or airborne components. For example, the driver 40 may be configured to controllably, manually, and/or automatically increase the current and/or voltage directed to the QCL 30 to strengthen and/or intensify the beam or signal emitted by the QCL 30 in such conditions. It is also understood that the signal emitter 14 may comprise at least one midrange QCL and at least one long range QCL to ensure satisfactory operation in such conditions.

In an exemplary embodiment, the QCL 30 may be pulsed at frequencies less than a millisecond. However, it is understood that, depending upon the intended use and range of the signal emitter 14, the repetition rate, peak power, beam, signal, and/or other distinguishing characteristics of the QCL output can be factory set or programmable/modifiable in the field as needed.

The lens 60 may be disposed in the beam or signal path 32 such that in one configuration, the lens 60 is retained substantially within the housing 20. However, it is contemplated the lens 60 can form an interface between the interior and the exterior of the housing 20. In still another exemplary embodiment, a window, the lens 60, and/or the QCL 30 may be disposed in an extension 25 of the housing 20 configured to assist in cooling the QCL 30. As discussed above, such an embodiment is illustrated in FIG. 2. The lens 60 can be configured to focus the beam or signal at a particular point. Alternatively, the lens 60 may be configured to spread or diverge the signal or beam as broadly as possible to maximize coverage. Alternatively, the lens 60 may be omitted from the signal emitter 14, and the QCL 30 may be configured as a widely-divergent beam or signal source. In such an embodiment, a window, dome, or other like structure may be employed such that the QCL 30 operates in and/or is otherwise maintained in a hermetically sealed environment. In one or more of these exemplary embodiments, the lens 60 can be a dedicated collimator, thereby collimating the beam or signal along the path 32. The lens 60 may be formed of a material substantially transparent to the wavelength of the beam or signal emitted by the QCL 30.

In an alternative configuration, a diffractive optic (not shown) can be located within the beam path 32 to provide collimation of the beam. That is, the diffractive optic may intersect the beam path 32 such that the beam passes through or reflects off the diffractive optic.

In an exemplary embodiment, the power supply 70 may include at least one battery. Depending upon the anticipated power requirements, available space, and weight restrictions, the batteries can be N-type batteries or AA or AAA batteries. Additionally, a lithium/manganese dioxide battery such as military battery BA-5390/U, manufactured by Ultralife Batteries Inc. of Newark, N.Y. can be used with the signal emitter 14. It is understood that any type of power supply 70, preferably portable and sufficiently small in size for use with any of the devices discussed herein, can be utilized. The battery-type power supply can be disposable or rechargeable.

The power supply 70 may be located within or external to the housing 20. In one configuration, the housing 20 may include a battery compartment sized to operably retain the power supply 70. The battery compartment can be formed of a weather resistant, resilient material such as plastic, and shaped to include receptacles for receiving one or more batteries or other power storage devices. Further, the battery compartment may be selectively closeable or sealable to prevent environmental migration into the compartment.

The power supply 70 may be operably connected to the driver 40 and can be controlled by or utilized under driver commands. Thus, the amount of power from the power supply 70 can be controlled or varied to alter the output of the QCL 30. As discussed above, however, the signal emitter 14 and each of its components may also be powered by one or more power supplies 80 of the device 12 to which the signal emitter 14 is connected. In such an exemplary embodiment, the power supply 70 may be omitted, and the driver 40 and/or other power distribution devices of the signal emitter 14 may distribute power from the power supply 80 to the signal emitter components.

In a further configuration, a cooler 50 can be disposed in thermal contact with the QCL 30. The cooler 50 may be disposed within the housing 20, and may be employed to maintain the QCL 30 at a desirable operating temperature. As certain configurations of the cooler 50 require energy input, it is advantageous that the housing 20, the QCL 30 and the driver 40 be configured to minimize thermal demands on the cooler 50. For example, at least a portion of the QCL 30 may be disposed outside of the housing 20 such that the QCL 30 is at least partially cooled by wind, atmospheric temperature, water, or other aspects of the external environment in which the signal emitter 14 is used. In an exemplary embodiment, the cooler 50 may assist in cooling the QCL 30 to approximately room temperature or between approximately 65° Fahrenheit and approximately 75° Fahrenheit. In additional exemplary embodiments, the cooler 50 may be configured to cool the QCL 30 to temperatures below room temperature, such as to approximately 32° Fahrenheit or lower. In such exemplary embodiments, one or more barriers, seals, walls, compartments, absorbent materials, and/or other like components may be employed proximate the QCL 30 to assist in isolating the QCL 30 from any condensation or moisture formed on and/or by the cooler 50. Such components may be included within the housing 20, or in alternative exemplary embodiments in which the signal emitter 14 is formed integrally with the device 12 and at least a portion of the housing 20 has been omitted, such components may also be disposed within and/or formed integrally with the device 12. The cooler 50 may comprise a thermoelectric cooler or any other cooler known in the art.

The cooler 50 can be a passive device or an active device. A passive cooler 50 may comprise a heat sink, a phase change element, a radiator, and/or one or more fins configured to dissipate thermal energy from the QCL 30. As used herein, a "phase change element" may include any element and/or material configured to absorb heat energy and utilize the absorbed energy to change the phase of, for example, a solid to a liquid. An active cooler 50 may comprise a Peltier module, a Stirling device, and/or one or more fans.

In a further exemplary embodiment, the signal emitter 14 may include a communicator 90 such as a receiver, a transmitter, and/or a transceiver for receiving and/or transmitting information from a remote source 92. As described above, such components may be operably connected to and/or connectable via one or more of the ports 23. Such information can include targeting data, strategic data, signaling data, emission data, operating or control signals, and/or other like data or signals useful in combat, law enforcement, reconnaissance, stealth location, or marking exercises. The communicator 90 may be operably connected to the power supply 70, 80 as well as the driver 40. Accordingly, the signal emitter 14 may be capable of communicating with the remote source 92 via the communicator 90. The communicator 90 and the remote source 92 may be capable of radio and data transmission at wireless frequencies, and/or other communication for the transmission of information, data, control signals, and the like. In an exemplary embodiment, such control signals may include on/off commands as well as control commands for remotely changing the pulse signature, frequency, wavelength, and/or other characteristics of the beam or signal emitted by the QCL 30. It is understood that corresponding functions or operations of the QCL 30 and/or the driver 40 may be changed or controlled in response to such control signals.

Figure 3:
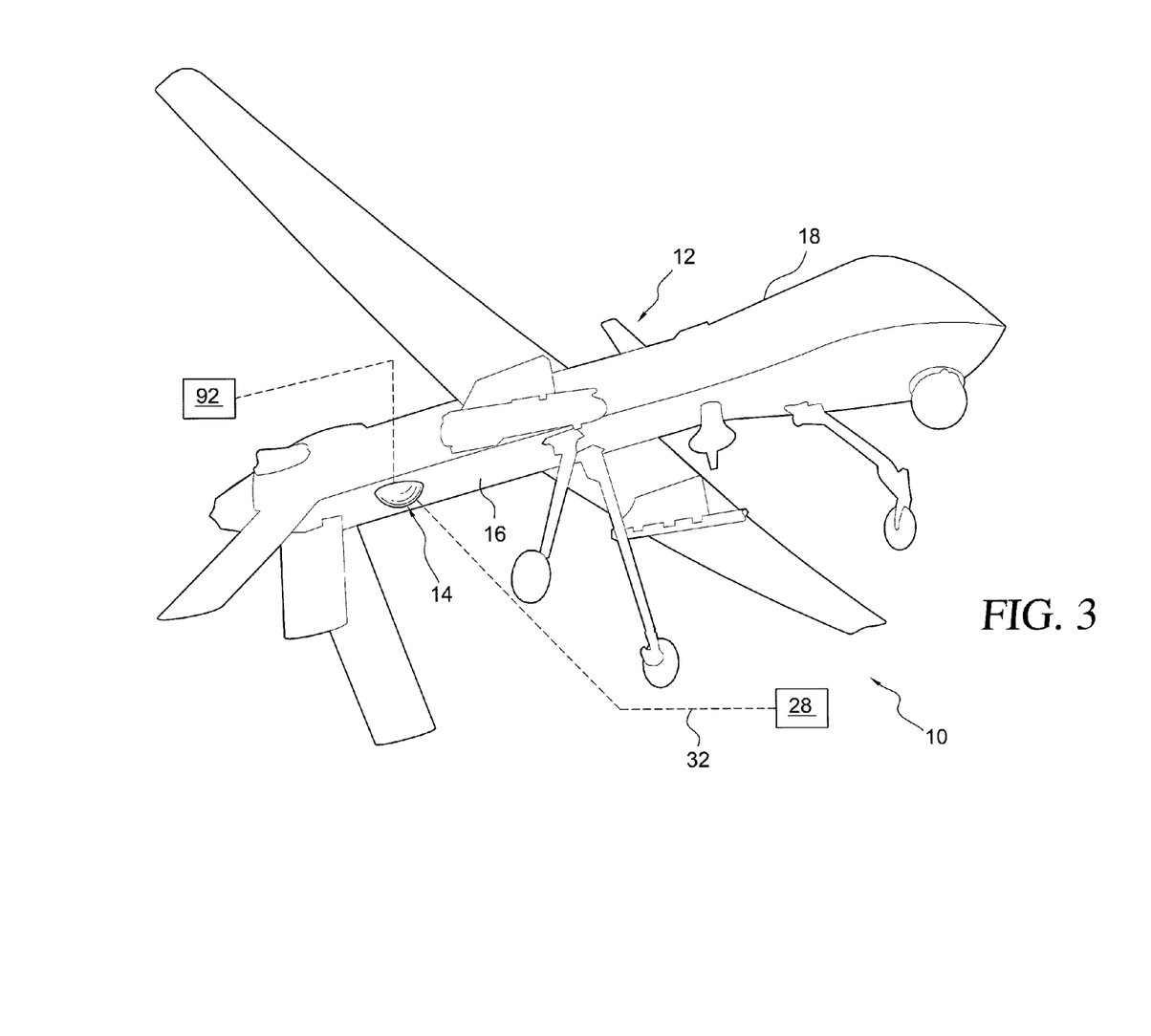
FIG. 3 illustrates a system for use in identifying an unmanned device, including an emitter disposed on an unmanned aerial vehicle according to an exemplary embodiment of the present disclosure.
Figure 4:
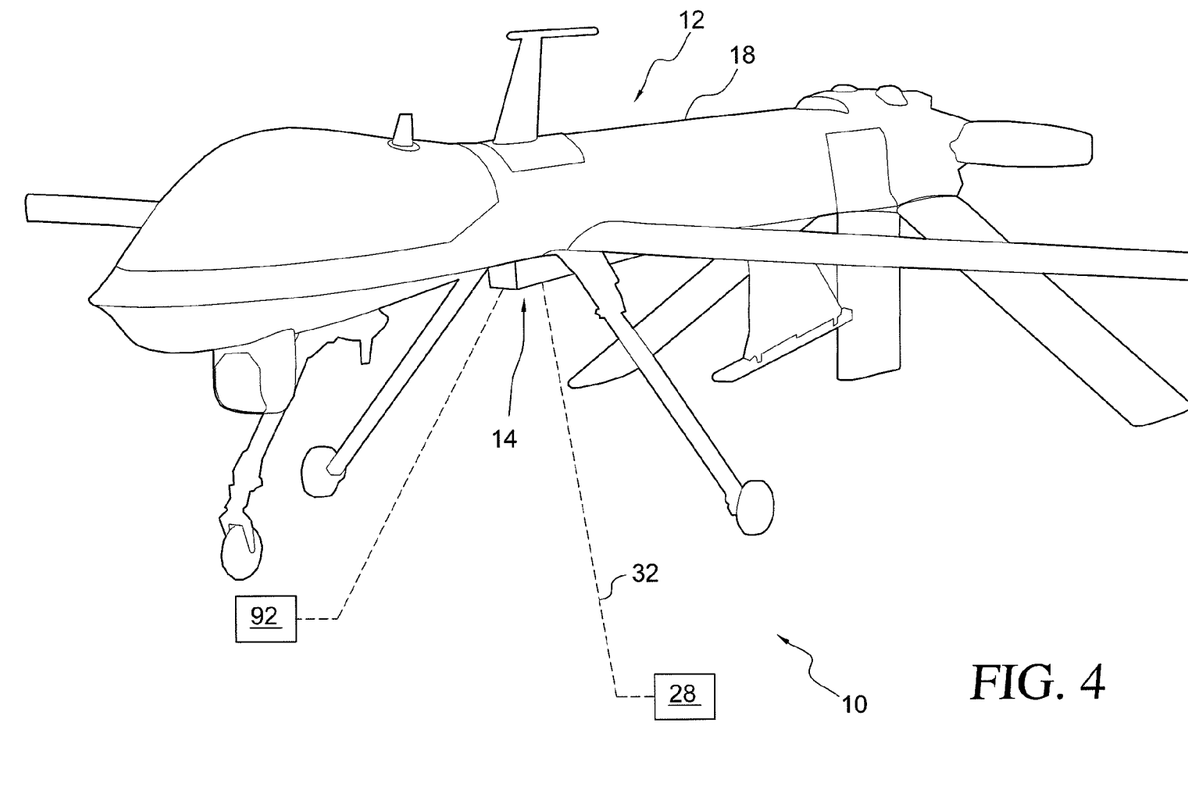
FIG. 4 is another view of the system shown in FIG. 1.
Figure 5:
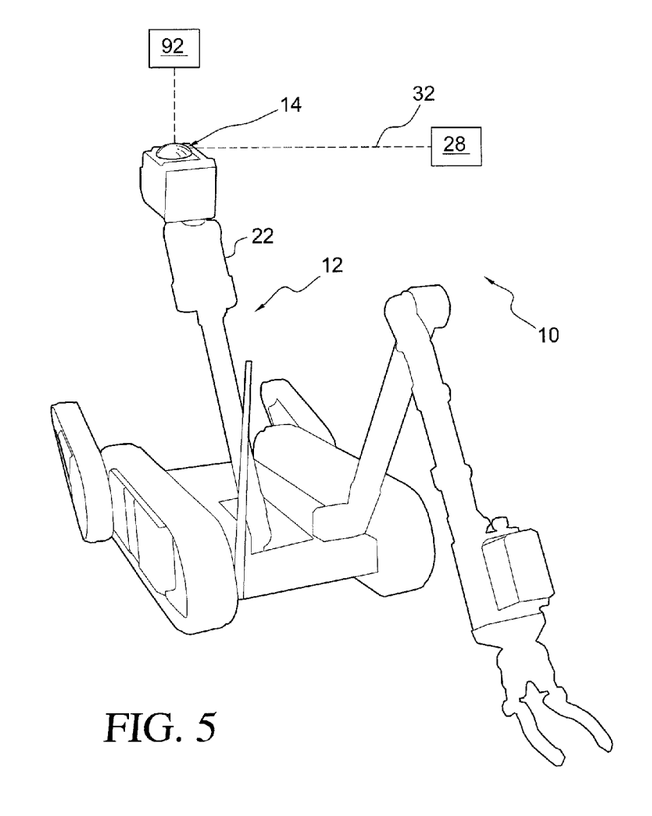
FIG. 5 illustrates a system for use in identifying an unmanned device, including an emitter disposed on an unmanned ground vehicle according to another exemplary embodiment of the present disclosure.
Figure 6:
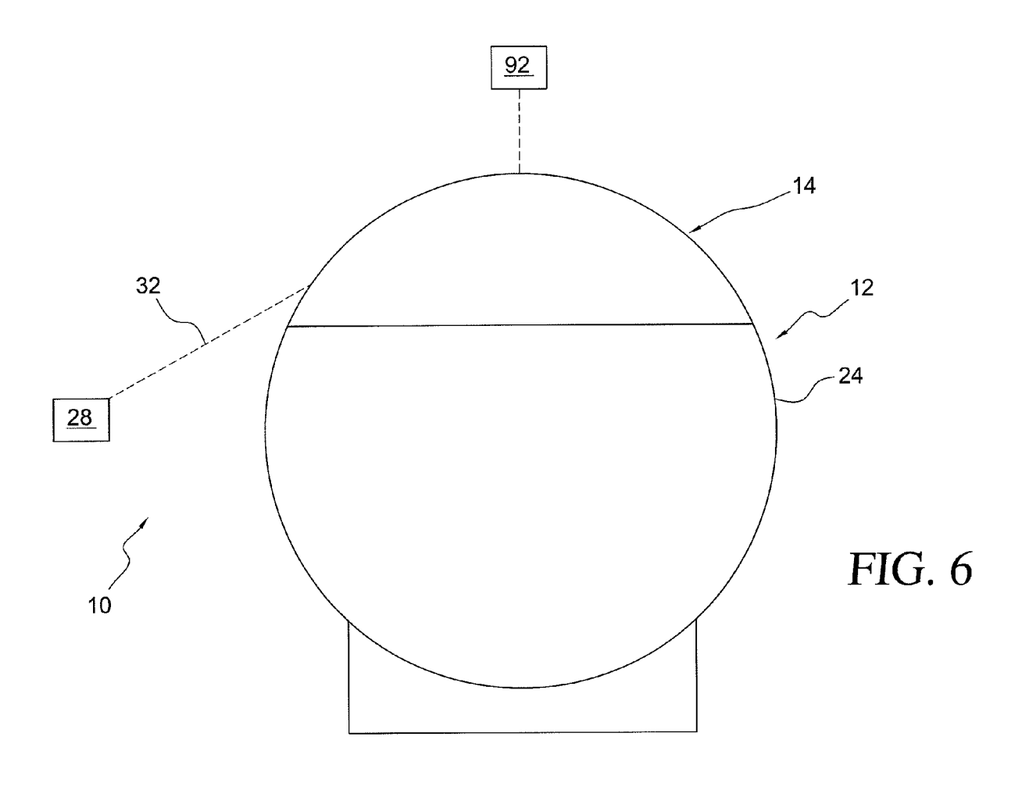
FIG. 6 illustrates a system for use in identifying an unmanned device, including an emitter disposed on a self-righting camera ball according to yet another exemplary embodiment of the present disclosure.
Figure 7:
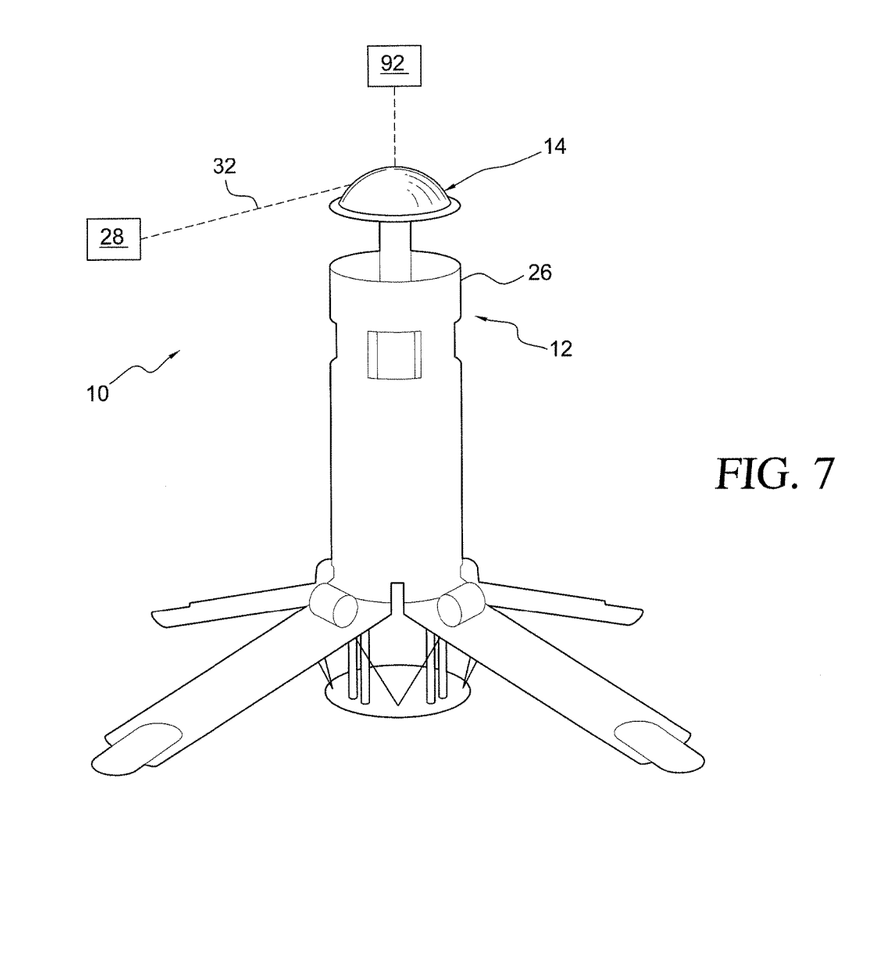
FIG. 7 illustrates a system for use in identifying an unmanned device, including an emitter disposed on an unattended ground sensor according to a further exemplary embodiment of the present disclosure.

FIGS. 3-5 illustrate exemplary systems 10 to aid in identification of an unmanned device 12 as either friend or foe. FIGS. 6 and 7 illustrate exemplary systems 10 for use in marking, identification and/or otherwise conveying information about a location or object. The systems 10 shown in FIGS. 3-7 may include, for example, among other things, a signal emitter 14 coupled to, formed integrally with, and/or otherwise associated with any of the devices 12 described herein. Such devices may be handheld and/or otherwise portable, and such exemplary systems 10 may further include, for example, a receiver 28 and/or the remote source 92.

As shown in FIGS. 3-5, the signal emitter 14 can be coupled to, formed integrally with, and/or otherwise associated with an unmanned aerial vehicle 18, an unmanned ground vehicle 22, and/or any of the other unmanned devices 12 known in the art. One or more such unmanned devices 12 may be remotely controlled. For example, these unmanned devices 12 may be controlled to fly, traverse ground terrain, maneuver underwater, and/or otherwise move in response to a remote control signal. Alternatively, devices 12 such as the unmanned aerial vehicle 18 and the unmanned ground vehicle 18 may be preprogrammed to fly or traverse ground terrain without dependence upon receipt of a remote control signal.

Further, as discussed above, the signal emitter 14 may be used in conjunction with, coupled to, formed integrally with, and/or otherwise associated with any known handheld devices, unattended devices, and/or unmanned marking devices. As shown in FIGS. 6 and 7, such devices 12 may include any known self-righting device, such as a self-righting camera ball 24, an unattended ground device 26, and/or any other like device 12. Such devices 12 may be useful in identifying a location and/or object, and may be portable in order to be desirably positioned at the object or location. For example, a self-righting device may be carried to a desired location and thrown or jettisoned to a particular spot at the desired location. The self-righting device may be weighted or otherwise constructed to right itself in a desired standing or otherwise upright position upon landing or coming to rest. The unattended ground device 26, on the other hand, may be configured to be, for example, carried by hand to the object or location and desirably positioned in such an upright position on stable ground.

In exemplary embodiments, one or more of the signal emitters 14 described herein may be coupled to, formed integrally with, and/or otherwise associated with such devices 12, and may emit a beam or signal informing a recipient of the beam or signal of information relevant to the marked location/object. Such information may include the location of a target, the location of friendly forces, the location of stored food, gear, or other resources, a perimeter or territory, the location of an injured or distressed soldier, and/or other useful information. It is also understood that in additional exemplary embodiments the signal emitter 14 may be used in connection with, coupled to, formed integrally with, and/or otherwise associated with one or more known unmanned aqueous vehicles. Such vehicles may include, for example, underwater vehicles or robots as well as amphibious vehicles or robots. Using a signal emitter 14 in an underwater environment may require adjustment of the spectral band in which the signal emitter 14 operates.

Use of the exemplary signal emitters 14 described herein in conjunction with the handheld marking devices, unmanned aerial vehicles 18, unmanned ground vehicles 22, unattended ground devices 26, self-righting devices such as self-righting camera balls 24, and/or the other devices 12 described above has not been previously accomplished successfully due to the complications and complexities associated with using such signal emitters 14 in association with such devices. For example, signal emitters 14 including one or more QCLs 30 are generally not capable of handheld use due to, for example, the heat generated by the QCL 30 (and corresponding cooling requirements for efficient functionality), the power requirements of known QCLs 30, and relative ease with which such an expensive and delicate component may be damaged by sudden jarring, mishandling, being dropped accidentally, or other like movement. Until now, these and other operating requirements specific to the QCL 30 have made it difficult, if not impossible, to utilize light, signal, beam, and/or radiation sources such as QCLs 30 for the marking, identification, signaling, and/or other operations described herein. The exemplary embodiments of the present disclosure overcome these known obstacles.

The receiver 28 may be any type of signal or beam detector known in the art. The receiver 28 may be configured to receive and interpret the beam, signal, and/or other emissions of the signal emitter 14. In addition, the receiver 28 may be configured to locate, identify, and distinguish such emissions from other similar emissions. As a result, the receiver 28 may be used to locate, identify, and distinguish one or more friendly emissions/signal emitters 14 from similar foe emissions/signal emitters 14. Thus, the particular receivers 28 described herein may be compatible with the signal emitters 14 of the present disclosure. The receiver 28 may be handheld and/or portable, and may be conveniently used in any of the combat or other applications discussed herein. In additional exemplary embodiments, the receiver 28 may be mounted in or on a ground vehicle, a rotary wing aircraft, a fixed wing aircraft, or any of the firearms discussed above.

As shown in FIGS. 3 and 4, in an exemplary embodiment, the signal emitter 14 may be disposed on and/or otherwise connected to the underside 16 of the unmanned aerial vehicle 18. Positioning the signal emitter 14 in this way may assist in cooling, for example, the QCL 30 of the signal emitter 14. In particular, positioning the signal emitter 14 on the underside 16 of such a device 12 may keep the signal emitter 14 substantially shielded from, for example, the sun. Such positioning may provide substantial cooling in, for example, the desert or other temperate environments. In additional exemplary embodiments, the signal emitter 14 may be disposed elsewhere on the unmanned aerial vehicle 18, such as at the top of the fuselage or at one of the wings. Such positioning may assist with and/or otherwise facilitate communication between, for example, two or more friendly unmanned aerial vehicles 18.

In addition, disposing the signal emitter 14 on an outer surface of such moving devices 12 may enable, for example, wind and/or ambient air to cool the QCL 30 as the device 12 moves. Such cooling may be particularly effective in relatively fast-moving devices 12 such as, for example, the unmanned aerial vehicle 18. In such exemplary embodiments, the housing configuration described with respect to FIG. 2 may be employed or, alternatively, the housing 20 may be omitted and the signal emitter 14 may be formed integrally with the device 12.

In an exemplary method of the present disclosure, the signal emitter 14 may be disposed on, coupled to, formed integrally with, and/or otherwise associated with the unmanned device 12 prior to its departure. When in the proximity of friendly forces, such forces may be equipped with a receiver 28 configured to detect the signals or beams emitted by the signal emitter 14, and thereby distinguish the friendly unmanned device 12 from other devices. Such a determination may be made based on the beam or signal emitted by the signal emitter 14. In addition, the signal or beam may be detected and distinguished, while the signal emitter 14 and the device 12 to which it is connected are approximately 4 km or more away. In additional exemplary embodiments, the signal or beam may be detected and distinguished while the signal emitter 14 and the device 12 are approximately 1 meter or more away. It is understood that the signal, beam, and/or other emissions of the signal emitter 14 may be distinguished from other like signals, beams, or emissions having, for example, like frequencies, pulse signatures, information, and/or any other identifiable or distinguishable characteristics or properties. As described above, in any of the embodiments described herein, the signal emitter 14 may be remotely activated and/or deactivated.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims

What is claimed is:

1. A system for use in identifying one of an unmanned ground vehicle and an unmanned aerial vehicle, the system comprising:

a signal emitter associated with the unmanned vehicle, the signal emitter including a housing having an aperture and at least one quantum cascade laser within a hermetically sealed environment within the housing and a driver configured to cause the quantum cascade laser to emit a signal having a wavelength between approximately 2 µm and approximately 30 µm,
wherein the quantum cascade laser is configured to emit the signal from the aperture, wherein the signal is detectable to identify the unmanned vehicle as friendly at a distance from the signal emitter greater than approximately 1 meter, and wherein the housing is configured to allow air from outside of the unmanned vehicle through the aperture so that heat generated by the quantum cascade laser is transferred from the hermetically sealed environment into the moving air during movement of the unmanned vehicle to cool the quantum cascade laser.

2. The system of claim 1, wherein the system is powered by a power source of the unmanned vehicle.

3. The system of claim 1, wherein the signal emitter is tunable such that at least one distinguishable characteristic of the signal can be modified.

4. The system of claim 3, wherein the at least one distinguishable characteristic comprises a pulse signature.

5. The system of claim 3, wherein the at least one distinguishable characteristic comprises the wavelength of the signal.

6. The system of claim 1, wherein the signal emitter is formed integrally with the unmanned device.

7. The system of claim 1, further comprising a divergent lens positioned in a beam path of the quantum cascade laser and optically downstream of the quantum cascade laser.

8. The system of claim 1, further comprising a collimating lens positioned in a beam path of the quantum cascade laser and optically downstream of the quantum cascade laser.

9. The system of claim 1, further comprising at least one of a dome and a window, positioned in a beam path of the quantum cascade laser and optically downstream of the quantum cascade laser.

10. The system of claim 9, further comprising a lens positioned in the beam path and optically upstream of the at least one dome or window.

11. The system of claim 1, further comprising a cooler disposed in thermal contact with the quantum cascade laser.

12. The system of claim 1, wherein the driver and the quantum cascade laser are powered by a power source of the unmanned vehicle.

13. The system of claim 1, wherein the unmanned vehicle is movable in response to a remote control signal.

14. The system of claim 1, wherein the housing is coupled to the outer surface of the unmanned vehicle.

15. The system of claim 14, wherein the housing is coupled to an underside of the unmanned vehicle and comprises an extension configured to further cool the quantum cascade laser.

16. The system of claim 15 wherein the extension further comprises a passive cooling device thermally connected to the quantum cascade laser.

17. The system of claim 1, wherein the signal emitter further comprises an additional beam source within the hermitically sealed environment.

18. The system of claim 1, wherein the signal is detectable and distinguishable from other like signals at a distance from the signal emitter of approximately 1 meter.

19. The system of claim 18, wherein the signal comprises one of a thermal beam and an optical beam.

20. The system of claim 1, further comprising a receiver disposed remote from the signal emitter, and selected to detect and distinguish the signal from other similar signals.

21. The system of claim 1, further comprising a communicator configured to receive information from a remote source.

* * * * *